(12) United States Patent
Padaki et al.

(10) Patent No.: US 11,343,064 B2
(45) Date of Patent: May 24, 2022

(54) SYSTEMS AND METHODS TO IMPROVE CO-EXISTENCE BETWEEN FIXED WIRELESS ACCESS AND SHORT RANGE DEVICES IN 802.11AY

(71) Applicant: Samsung Electronics Co., Ltd., Suwon-si (KR)

(72) Inventors: Aditya V. Padaki, Richardson, TX (US); Jianhua Mo, Garland, TX (US); Boon Loong Ng, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 16/401,050

(22) Filed: May 1, 2019

(65) Prior Publication Data

US 2019/0342065 A1    Nov. 7, 2019

Related U.S. Application Data

(60) Provisional application No. 62/729,685, filed on Sep. 11, 2018, provisional application No. 62/675,874, filed on May 14, 2018, provisional application No. 62/666,478, filed on May 3, 2018.

(51) Int. Cl.
| | |
|---|---|
| *H04L 12/26* | (2006.01) |
| *H04L 5/14* | (2006.01) |
| *H04L 1/00* | (2006.01) |
| *H04W 74/08* | (2009.01) |
| *H04W 72/12* | (2009.01) |
| *H04W 72/04* | (2009.01) |

(52) U.S. Cl.
CPC ......... *H04L 5/1476* (2013.01); *H04L 1/0003* (2013.01); *H04W 72/0446* (2013.01); *H04W 72/1231* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2015/0045076 A1 | 2/2015 | Pan et al. | |
| 2015/0373725 A1 | 12/2015 | Oh et al. | |
| 2016/0056907 A1 | 2/2016 | Wei et al. | |
| 2018/0092055 A1* | 3/2018 | Cariou | H04B 7/0452 |
| 2018/0255537 A1* | 9/2018 | Park | H04L 5/001 |
| 2019/0037397 A1* | 1/2019 | Trainin | H04W 12/06 |

(Continued)

OTHER PUBLICATIONS

Supplementary European Search Report dated Mar. 15, 2021 in connection with European Application No. 19796711.0, 4 pages.

(Continued)

*Primary Examiner* — Zewdu A Beyen

(57) ABSTRACT

A method of a second node for a co-existence operation in a wireless communication system is provided. The method comprises transmitting, to a first node, a first extended schedule element (ESE) frame including a time-division multiplexing service period (TDD-SP) bit, receiving, from the first node, a preamble or a second ESE frame including a short device co-existence (SRD Co-Ex) indicator that is set to one based on the TDD-SP bit, and changing a transmit-receive slot pattern based on the received preamble or SRD Co-Ex indicator for the co-existence operation.

20 Claims, 14 Drawing Sheets

(56) References Cited

U.S. PATENT DOCUMENTS

2019/0045520 A1* 2/2019 Venkatachalam Jayaraman ......... H04W 72/121
2019/0081674 A1* 3/2019 Oteri ..................... H04B 7/061

OTHER PUBLICATIONS

IEEE 802.11ay/D1.2, 802.11 Working Group of the LAN/MAN Standards Committee of the IEEE Computer Society, Apr. 2018, 581 pages.
Hansen et al., "TDD Coexistence", IEEE 802.11-18/0877r2, May 2018, 10 pages.
Alex et al., "Field Measurement Results for Distribution Networks and Short Range Devices Coexistence", IEEE 802.11-18/04889r1, Mar. 2018, 22 pages.
Alex et al., "Field Measurement Results for Distribution Networks and Short Range Devices Coexistence—Part 2", IEEE 802.11-17/0749r0, May 2018, 20 pages.
Abouelseoud et al., "TDD-SP Coexistence", IEEE 802.11-18/1586r1, Sep. 2018, 11 pages.
PADAKI et al., "Framework for enhancing DN-SRD co-existence", IEEE 802.11-18/1150-r1, Sep. 2018, 14 pages.
Padaki et al., "Co-existence of Distribution Nodes and Short Range Devices", IEEE 802.11-18/0833-r2, May 2018, 20 pages.
Cordeiro et al., "Scheduling for mmWave Distribution Networks", IEEE 802.11-17/1323r2, Sep. 2017, 24 pages.
Djordje Tujkovic et al., "Distribution Networks and Short Range Devices Coexistence", IEEE 802.11-18/0131r0, Jan. 16, 2018, 13 pages.
International Search Report dated Aug. 14, 2019 in connection with International Patent Application No. PCT/KR2019/005345, 3 pages.
Written Opinion of the International Searching Authority dated Aug. 14, 2019 in connection with International Patent Application No. PCT/KR2019/005345, 4 pages.

* cited by examiner

| L-STF | L-CEF | L-Header | EDMG Header-A | Co-EX Indicator | EDMG STF | EDMG CEF | EDMG Header-B | Data | TRN |

| TDD-SP Indicator | Time to next DN-SRD Co-EX Slot |

| L-STF | L-CEF | L-Header | EDMG Header-A | EDMG STF | EDMG CEF | EDMG Header-B | Co-EX Indicator | TRN |

DATA

| CIF Header | TDD-SP Indicator | Beacon Interval | CIF Interval | CIF Number |

SYSTEMS AND METHODS TO IMPROVE CO-EXISTENCE BETWEEN FIXED WIRELESS ACCESS AND SHORT RANGE DEVICES IN 802.11AY

CROSS-REFERENCE TO RELATED APPLICATION(S) AND CLAIM OF PRIORITY

The present application claims priority to:
U.S. Provisional Patent Application Ser. No. 62/666,478 filed on May 3, 2018;
U.S. Provisional Patent Application Ser. No. 62/675,874 filed on May 24, 2018; and
U.S. Provisional Patent Application Ser. No. 62/729,685 filed on Sep. 11, 2018.

The content of the above-identified patent documents is incorporated herein by reference.

TECHNICAL FIELD

The present disclosure relates generally to co-existence between fixed wireless access and short range devices in wireless communication systems.

BACKGROUND

A communication system includes a downlink (DL) that conveys signals from transmission points such as access points (APs), base stations (BSs) or eNodeBs to user equipments (UEs) or stations (STAs) and an uplink (UL) that conveys signals from STAs to reception points such as APs. A STA, also commonly referred to as a terminal or a mobile station, may be fixed or mobile and may be a cellular phone, a personal computer device, etc. An AP, which is generally a fixed station, may also be referred to as an access point or other equivalent terminology.

SUMMARY

Embodiments of the present disclosure provide methods and apparatuses for co-existence between fixed wireless access and short range devices in wireless communication systems.

In one embodiment, a first node for a co-existence operation in a wireless communication system is provided. The first node comprises a transceiver configured to receive interference from a second node. The first node further comprises a processor operably connected to the transceiver, the processor configured to determine whether a level of the interference exceeds a pre-determined threshold and decode a time-division multiplexing service period (TDD-SP) bit included in a first extended schedule element (ESE) frame received from the second node when the level of the interference exceeds the pre-determined threshold. The transceiver of the first node is further configured to transmit, to the second node, a preamble or a second ESE frame including a short range device co-existence (SRD Co-Ex) indicator that is set to one based on a value of the decoded TDD-SP bit.

In another embodiment, a second node for a co-existence operation in a wireless communication system is provided. The second node comprises a transceiver configured to transmit, to a first node, a first extended schedule element (ESE) frame including a time-division multiplexing service period (TDD-SP) bit, and receive, from the first node, a preamble or a second ESE frame including a short range device co-existence (SRD Co-Ex) indicator that is set to one based on the TDD-SP bit. The second node further configured to a processor operably connected to the transceiver, the processor configured to change a transmit-receive slot pattern based on the received preamble or SRD Co-Ex indicator for the co-existence operation.

In yet another embodiment, a method of a second node for a co-existence operation in a wireless communication system is provided. The method comprises transmitting, to a first node, a first extended schedule element (ESE) frame including a time-division multiplexing service period (TDD-SP) bit, receiving, from the first node, a preamble or a second ESE frame including a short device co-existence (SRD Co-Ex) indicator that is set to one based on the TDD-SP bit, and changing a transmit-receive slot pattern based on the received preamble or SRD Co-Ex indicator for the co-existence operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 17 illustrates an example modified EDMG PHY packet structure comprising of Co-EX indicator field according to embodiments of the present disclosure;

FIG. 18 illustrates an example Co-EX indicator of the modified PHY packet structure according to embodiments of the present disclosure;

FIG. 19 illustrates an example Co-EX information frame (CIF) according to embodiments of the present disclosure; and FIG. 20 illustrates an example format of Co-EX indicator within CIF according to embodiments of the present disclosure.

DETAILED DESCRIPTION

Figure 1:
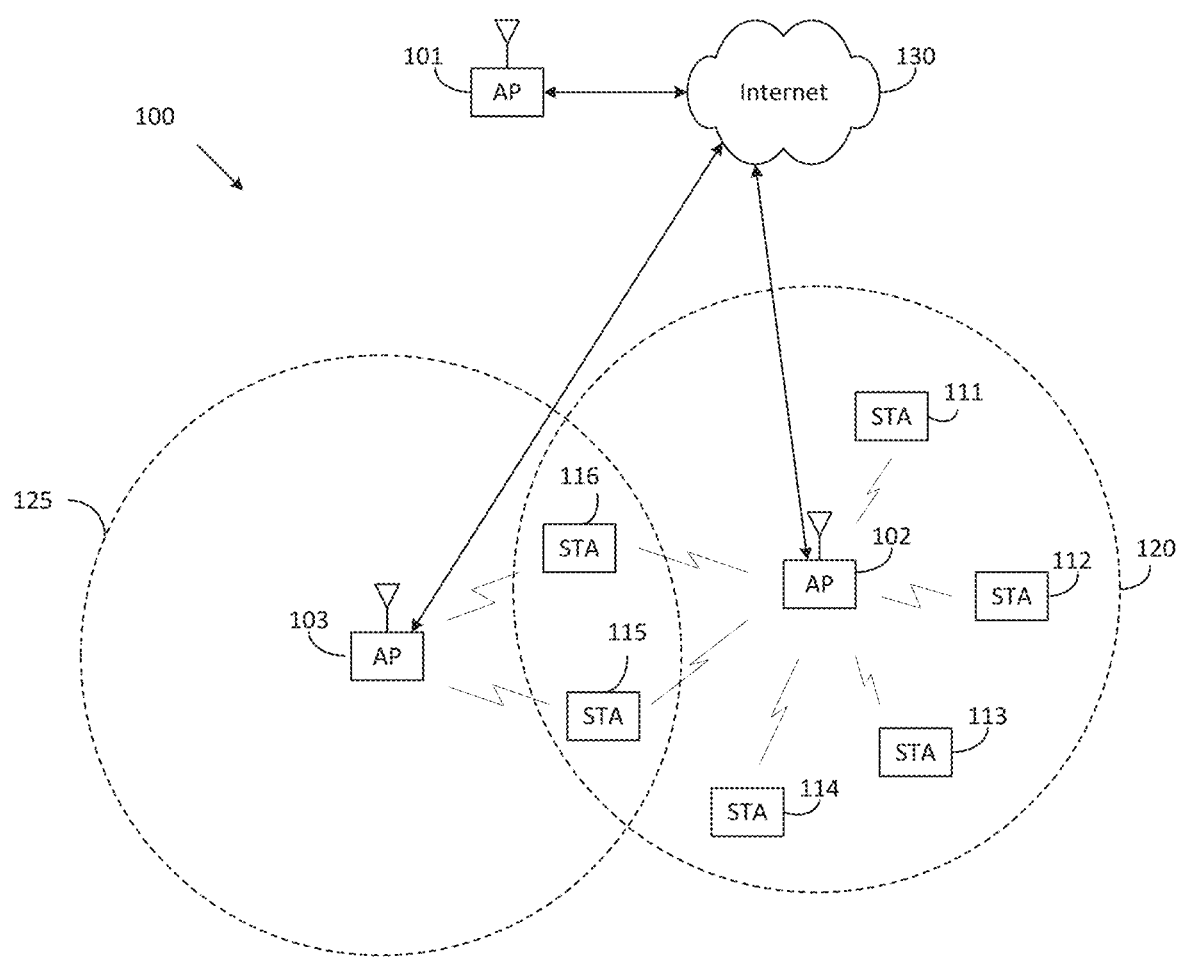
FIG. 1 illustrates an example wireless network according to embodiments of the present disclosure.

FIGS. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: Samsung: "Framework to enhance DN-SRD coexistence," IEEE 802.11ay doc: 11-18-1150-01; and Samsung: "Co-existence of Distribution Nodes and Short Range Devices," IEEE 802.11ay doc: 11-18-0833-02.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "AP" and "BS" are used interchangeably in this disclosure document to refer to the network infrastructure components that provide wireless access to remote terminals.

Also, depending on the network type, the term "station" or "STA" or "user equipment" or "UE" can refer to any component such as "mobile station," "subscriber station," "remote terminal," "wireless terminal," "receive point," or "user device." For the sake of convenience, the terms "station" and "STA" are used in this disclosure to refer to remote wireless equipment that wirelessly accesses an AP, whether the STA is a mobile device (such as a mobile telephone or smartphone) or is normally considered a stationary device (such as a desktop computer or vending machine). The term "distribution nodes" or "DN"s is referred to a class of APs that provide backhaul links to the wireless network. The term "client nodes" or "CN"s is referred in a class of APs that engage with the DNs over wireless links to further provide wireless service to the UEs or STAs. The term "short range devices" or "SRD"s refer to the devices employing a wireless technology to carry out data transfer over a wireless link with relatively short physicals distance.

Figure 2:
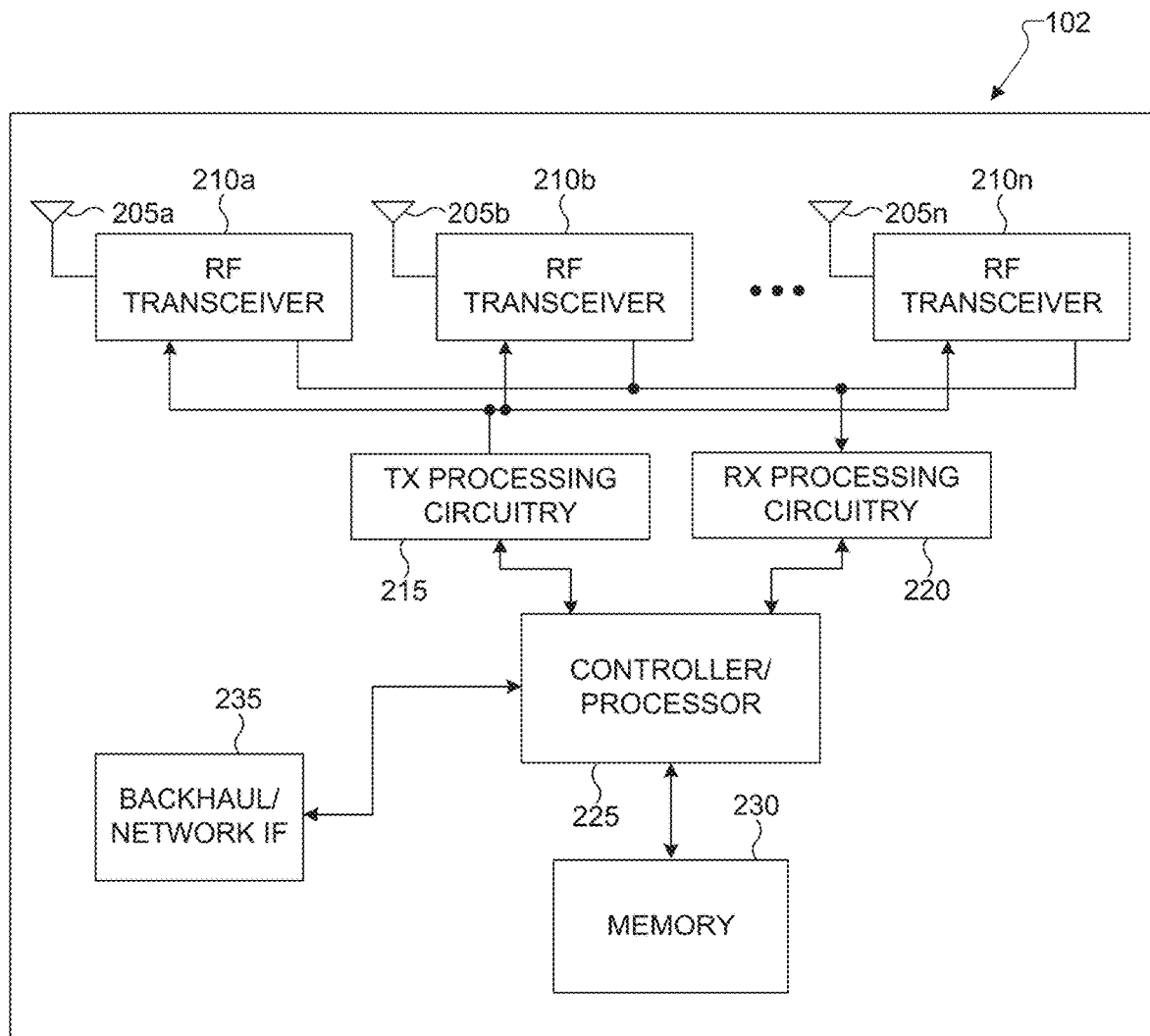
FIG. 2 illustrates an example AP according to embodiments of the present disclosure.
Figure 3:
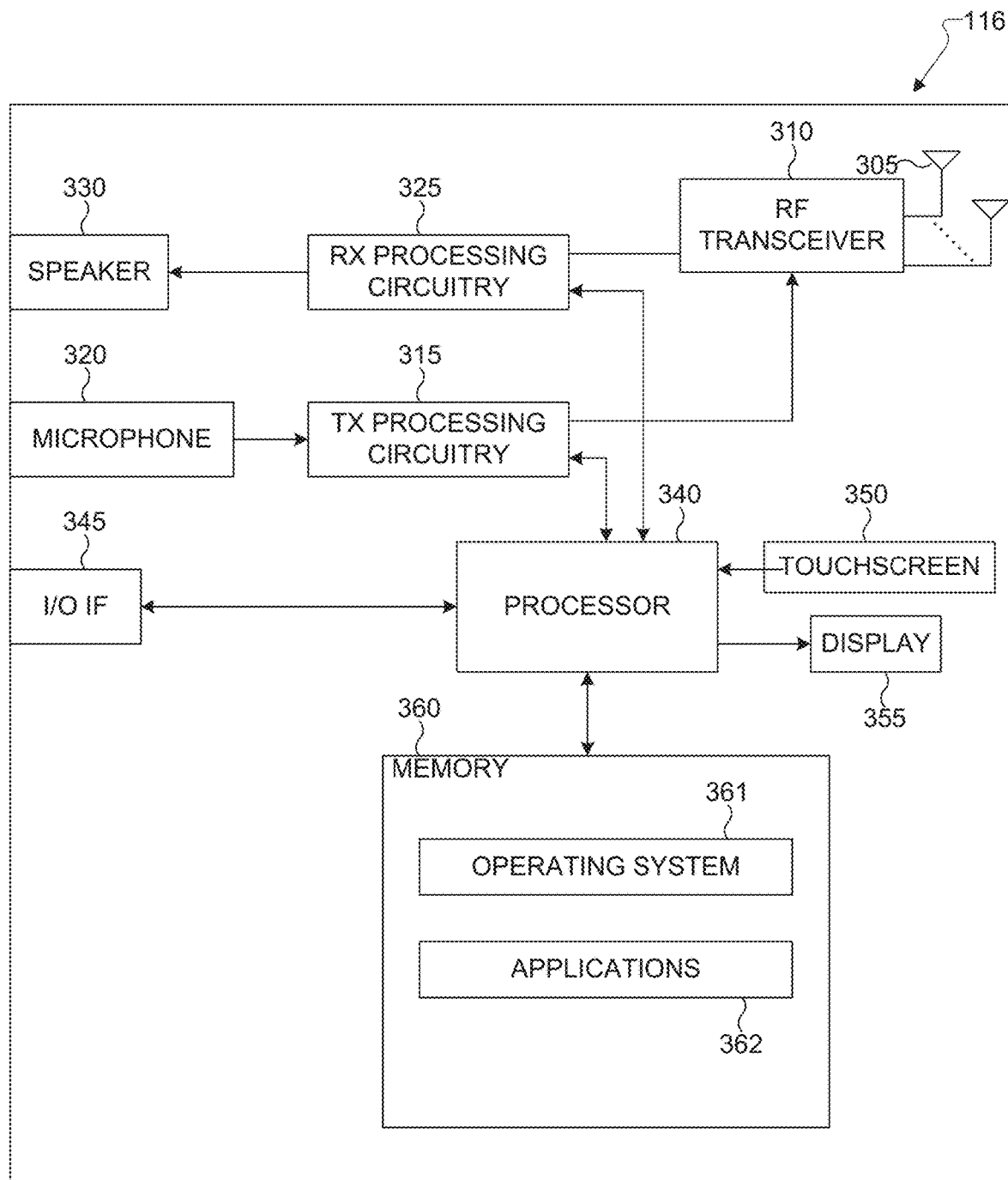
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an AP 101, an AP 102, and am AP 103. The AP 101 communicates with the AP 102 and the AP 103. The AP 101 also communicates with at least one network 130, such as the Internet, a proprietary Internet Protocol (IP) network, or other data network.

The AP 102 provides wireless broadband access to the network 130 for a first plurality of user equipments (UEs) within a coverage area 120 of the AP 102. The first plurality of STAs includes a STA 111, which may be located in a small business (SB); a STA 112, which may be located in an enterprise (E); a STA 113, which may be located in a WiFi hotspot (HS); a STA 114, which may be located in a first residence (R); a STA 115, which may be located in a second residence (R); and a STA 116, which may be a mobile device (M), such as a cell phone, a wireless laptop, a wireless PDA, or the like. The AP 103 provides wireless broadband access to the network 130 for a second plurality of UEs within a coverage area 125 of the AP 103. The second plurality of STAs includes the STA 115 and the STA 116. In some embodiments, one or more of the APs 101-103 may communicate with each other and with the APs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the STAs 111-116 include circuitry, programing, or a combination thereof, for efficient power control in an advanced wireless communication system. In certain embodiments, and one or more of the APs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs (e.g., access point (AP)) and any number of UEs (e.g., station (STA)) in any suitable arrangement. Also, the access point 101 could communicate directly with any number of stations and provide those stations (STAs) with wireless broadband access to the network 130. Similarly, each AP 102-103 could communicate directly with the network 130 and provide STAs with direct wireless broadband access to the network 130. Further, the APs 101, 102, and/or 103 could provide access to other or additional external networks, such as external telephone networks or other types of data networks.

FIG. 2 illustrates an example access point (AP) 102 according to embodiments of the present disclosure. The embodiment of the AP 102 illustrated in FIG. 2 is for illustration only, and the APs 101 and 103 of FIG. 1 could have the same or similar configuration. However, APs come in a wide variety of configurations, and FIG. 2 does not limit the scope of this disclosure to any particular implementation of an AP.

As shown in FIG. 2, the AP 102 includes multiple antennas 205a-205n, multiple RF transceivers 210a-210n, transmit (TX) processing circuitry 215, and receive (RX) processing circuitry 220. The AP 102 also includes a controller/processor 225, a memory 230, and a backhaul or network interface 235.

The RF transceivers 210a-210n receive, from the antennas 205a-205n, incoming RF signals, such as signals transmitted by STAs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the AP 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the AP 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the AP 102 to communicate with other devices or systems over a backhaul connection or over a network. The interface 235 could support communications over any suitable wired or wireless connection(s). For example, when the AP 102 is implemented as part of a cellular communication system (such as one supporting 5G, LTE, or LTE-A), the interface 235 could allow the AP 102 to communicate with other APs over a wired or wireless backhaul connection. When the AP 102 is implemented as an access point, the interface 235 could allow the AP 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of AP 102, various changes may be made to FIG. 2. For example, the AP 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the AP 102 could include multiple instances of each (such as one per RF transceiver). Also, various components in FIG. 2 could be combined, further subdivided, or omitted and additional components could be added according to particular needs.

FIG. 3 illustrates an example STA 116 according to embodiments of the present disclosure. The embodiment of the UE 116 illustrated in FIG. 3 is for illustration only, and the STAs 111-115 of FIG. 1 could have the same or similar configuration. However, STAs come in a wide variety of configurations, and FIG. 3 does not limit the scope of the present disclosure to any particular implementation of a STA.

As shown in FIG. 3, the STA 116 includes an antenna 305, a radio frequency (RF) transceiver 310, TX processing circuitry 315, a microphone 320, and receive (RX) processing circuitry 325. The STA 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an AP of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from an AP or an operator. The processor 340 is also coupled to the I/O interface 345, which provides the STA 116 with the ability to connect to other devices, such as laptop computers and handheld computers. The I/O interface 345 is the communication path between these accessories and the processor 340.

The processor 340 is also coupled to the touchscreen 350 and the display 355. The operator of the STA 116 can use the touchscreen 350 to enter data into the STA 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of STA 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the STA 116 configured as a mobile telephone or smartphone, STAs could be configured to operate as other types of mobile or stationary devices.

IEEE 802.11ay standards has currently included the use case for providing internet service to buildings (residential/commercial/etc.) through wireless backhaul (or fixed wireless access). In addition, the E-UTRAN supports relaying by having a relay node (RN) or relay base station (BS) or distribution node (DN) in the case of 802.11ay, wirelessly connect to an eNB or DN serving the RN, called donor eNB (DeNB) or donor BS or fiber DN (FDN). For NG-RAN, wireless backhaul link or network support is expected to be a part of the Release-16 of the new radio (NR) standards The wireless backhaul link is also supported as a use case in the most recent IEEE 802.11ay networks.

The operating frequency band for wireless backhaul link or network can be in ultra high frequency (UHF) (300 MHz-3 GHz), super high frequency (SHF) (3 GHz-30 GHz) or extremely high frequency (EHF) (30-300 GHz). Wireless backhaul link or network can be based on radio technology such as IEEE 802.11ac, 802.11ax, 802.11ad and 802.11ay.

Figure 4:
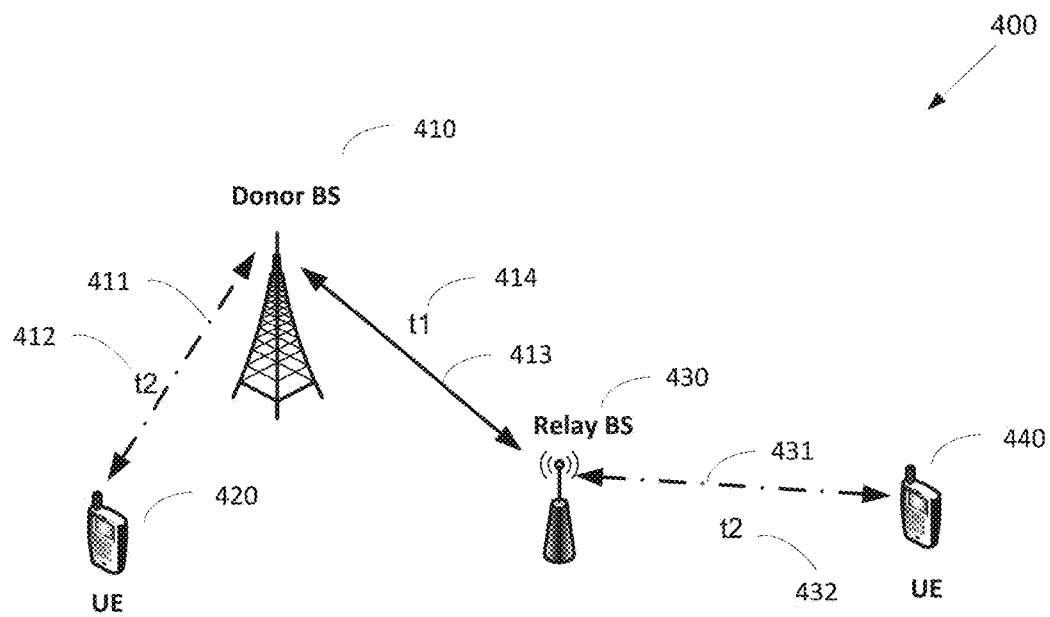
FIG. 4 illustrates an example wireless network with relay BS (EUTRAN) according to embodiments of the present disclosure.

FIG. 4 illustrates an example wireless network with relay BS (EUTRAN) 400 according to embodiments of the present disclosure. The embodiment of the wireless network with relay BS (EUTRAN) 400 illustrated in FIG. 4 is for illustration only. FIG. 4 does not limit the scope of the present disclosure to any particular implementation.

Referring to FIG. 4, a RN 430 is wirelessly connect to an eNB serving the RN, called donor eNB (DeNB) or donor BS 410, via the Un interface 413, which is also be referred to as the backhaul for the RN. The RN supports the eNB functionality, i.e. it terminates the radio protocols of the E-UTRA radio interface, and the S1 and X2 interfaces. In addition to the eNB functionality, the RN also supports a subset of the UE functionality, e.g., physical layer, layer-2, RRC, and NAS functionality, in order to wirelessly connect to the DeNB. A UE can be served directly by the DeNB, such as UE 420, or it can be served by a RN, such as UE 440. For in-band relay operation, the wireless backhaul link 413 for the RN and the wireless access links 411, 431 for the DeNB and the RN share the same frequency band.

Figure 5:
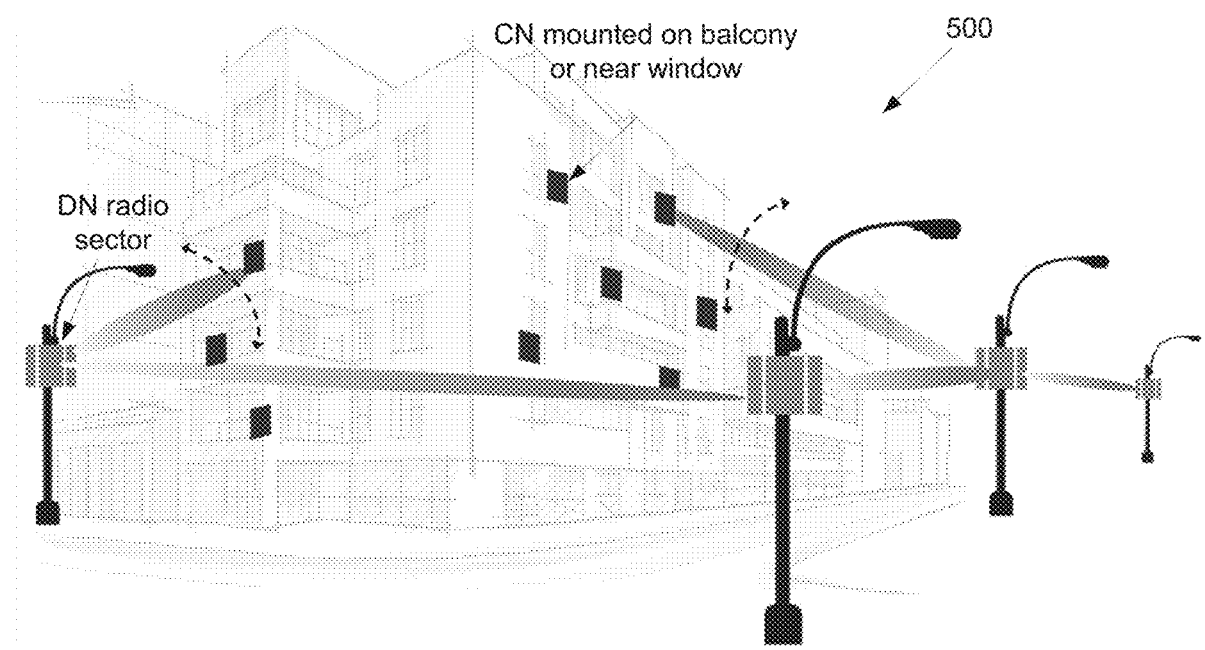
FIG. 5 illustrates an example wireless backhaul mesh network according to embodiments of the present disclosure.

FIG. 5 illustrates an example wireless backhaul mesh network 500 according to embodiments of the present disclosure. The embodiment of the wireless backhaul mesh network 500 illustrated in FIG. 5 is for illustration only. FIG. 5 does not limit the scope of the present disclosure to any particular implementation.

With a network of one or more donor BSs and one or more relays, a wireless multi-hop or a mesh network can be formed. In one example use case, the mesh backhaul network transports traffic from fiber gateway to fixed access points (distribution point to local network in building/home) as shown in FIG. 5.

Figure 6:
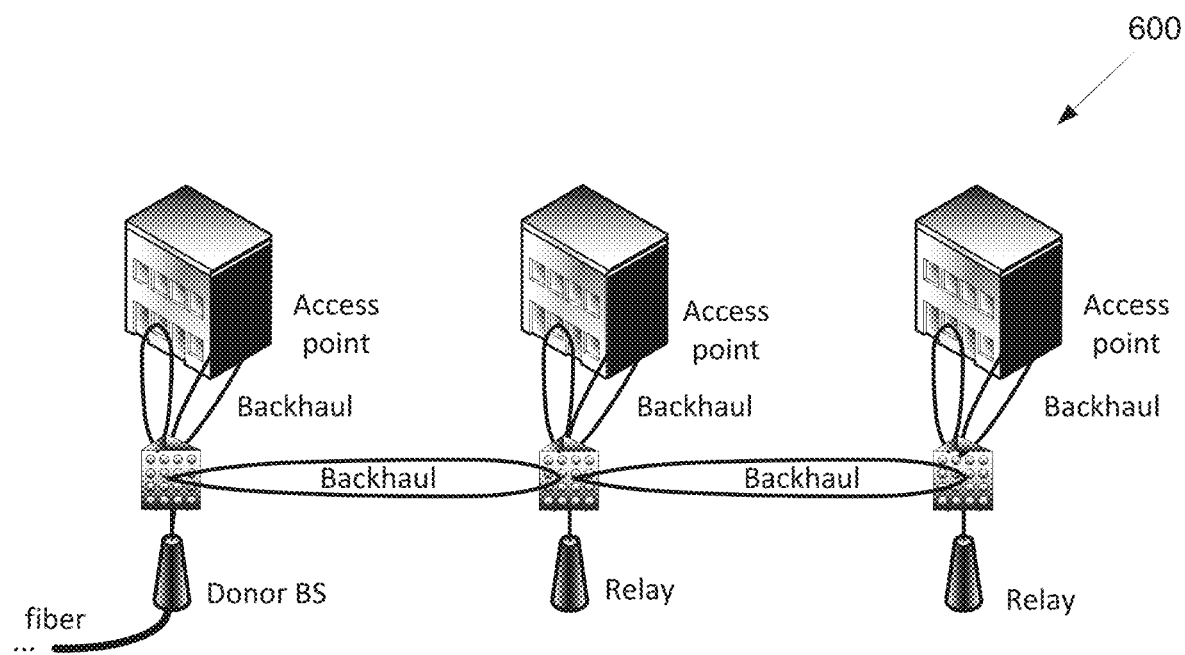
FIG. 6 illustrates an example multi-hop backhaul network according to embodiments of the present disclosure.

FIG. 6 illustrates an example multi-hop backhaul network 600 according to embodiments of the present disclosure. The embodiment of the multi-hop backhaul network 600 illustrated in FIG. 6 is for illustration only. FIG. 6 does not limit the scope of the present disclosure to any particular implementation.

Figure 7:
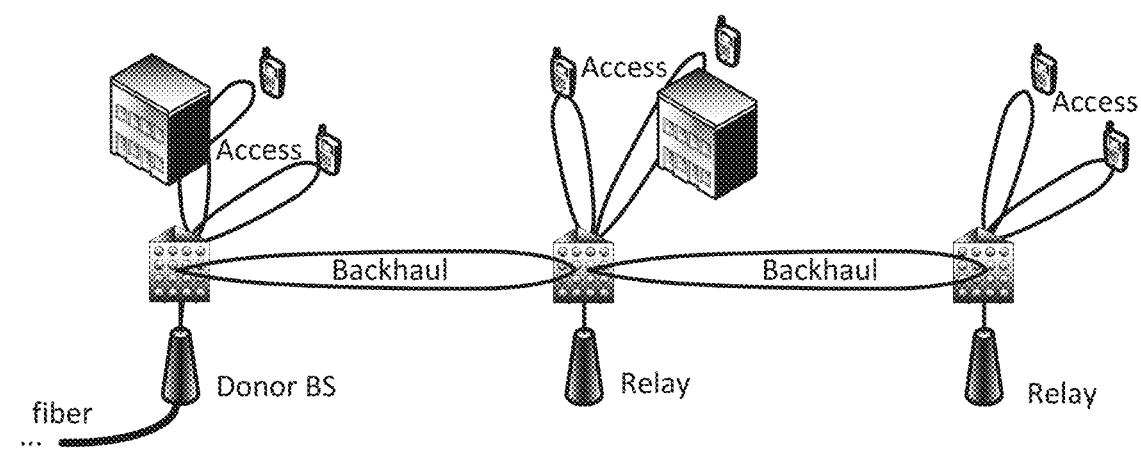
FIG. 7 illustrates an example multi-hop backhaul and access network according to embodiments of the present disclosure.

FIG. 7 illustrates an example multi-hop backhaul and access network 700 according to embodiments of the present disclosure. The embodiment of the multi-hop backhaul and access network 700 illustrated in FIG. 7 is for illustration only. FIG. 7 does not limit the scope of the present disclosure to any particular implementation.

In another example use case, the relay nodes serve as mesh network node for backhaul as well as access point to mobile users as shown in FIG. 7. The access frequency and backhaul frequency may or may not be the same.

While the BS or DNs employ backhaul, several other wireless devices may independently be operating over the same set of wireless channels in the same spatio-temporal-spectral domains. Such wireless devices in the present disclosure are referred to as short range devices (SRDs). The wireless backhaul networks may adversely impact the operations of SRDs. Typically, the SRDs employ listen before talk (LBT) schemes, which basically entails sensing the signal strengths in the channels of interest, and accessing the channel only if the sensed signal strengths are lesser than a pre-defined threshold (e.g., clear channel assessment (CCA) threshold for IEEE 802.11 devices).

Figure 8:
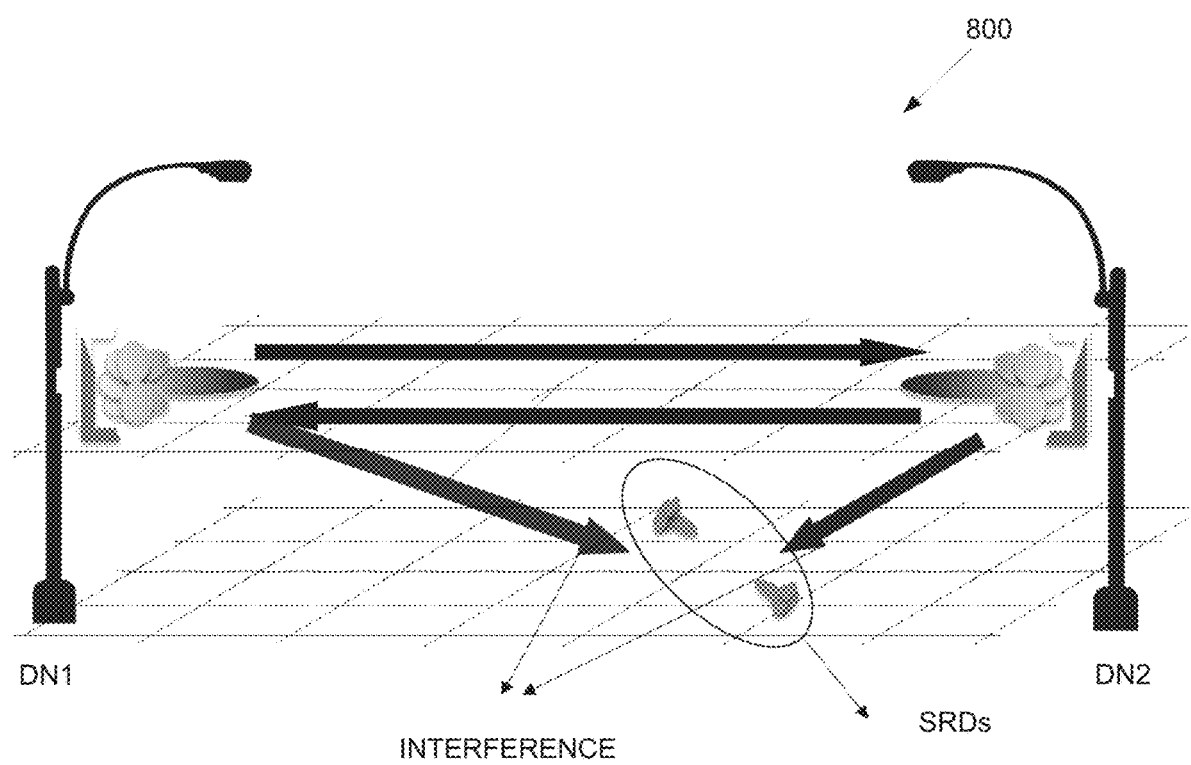
FIG. 8 illustrates an example distribution node (DN) causing interference to SRDs according to embodiments of the present disclosure.

FIG. 8 illustrates an example DN causing interference 800 to SRDs according to embodiments of the present disclosure. The embodiment of the DN causing interference 800 illustrated in FIG. 8 is for illustration only. FIG. 8 does not limit the scope of the present disclosure to any particular implementation.

Thus, if the signal levels of backhaul links exceed the threshold prescribed for the SRDs, it may result in a significant co-existence problem, as the backhaul devices (DNs or BS) generally do not employ LBT schemes (e.g., a non-LBT scheme), and thus would be oblivious to the fact that they may be potentially causing (unintended) denial of service for the SRDs. A graphic illustration of the present disclosure is shown in FIG. 8. While SRDs are described as using an LBT schemes or operating in a LBT mode and DNs are described as using non-LBT schemes or operating in a non-LBT mode, this is an example. Either or both of DNs and SRDs may use LBT or non-LBT schemes or operate in a LBT or non-LBT modes. The present disclosure is not limited to DNs or SRDs, but can apply to any TDD-STAs not employing LBT and any non-TDD STA employing LBT.

DNs may have an adverse effect on SRDs, but schemes to alleviate or mitigate the DN interference to SRDs are not prevalent. The present disclosure provides apparatus and methods to alleviate, avoid or mitigate interference from DNs to the SRDs.

In one embodiment, an apparatus for SRD to intimate DN that it is facing harmful interference is provided.

In the present disclosure, some schemes are provided for the SRD to intimate the harmful interference in which the DN causes. The term harmful interference in the present disclosure means that the DN is essentially blocking the SRD from establishing the communication link. Presence of harmful interference can be discerned through many ways including but not limited to the received DN power at SRD exceeding a certain threshold (e.g., CCA), the max contention window size is reached (contention window size gets incremented when ACK is not received), CCA doesn't pass for consecutive integer number of slots, or the CCA pass percentage is below a certain percent, etc. The apparatus to indicate harmful interference is captured through the embodiment as shown in FIG. 9A.

Figure 9A:
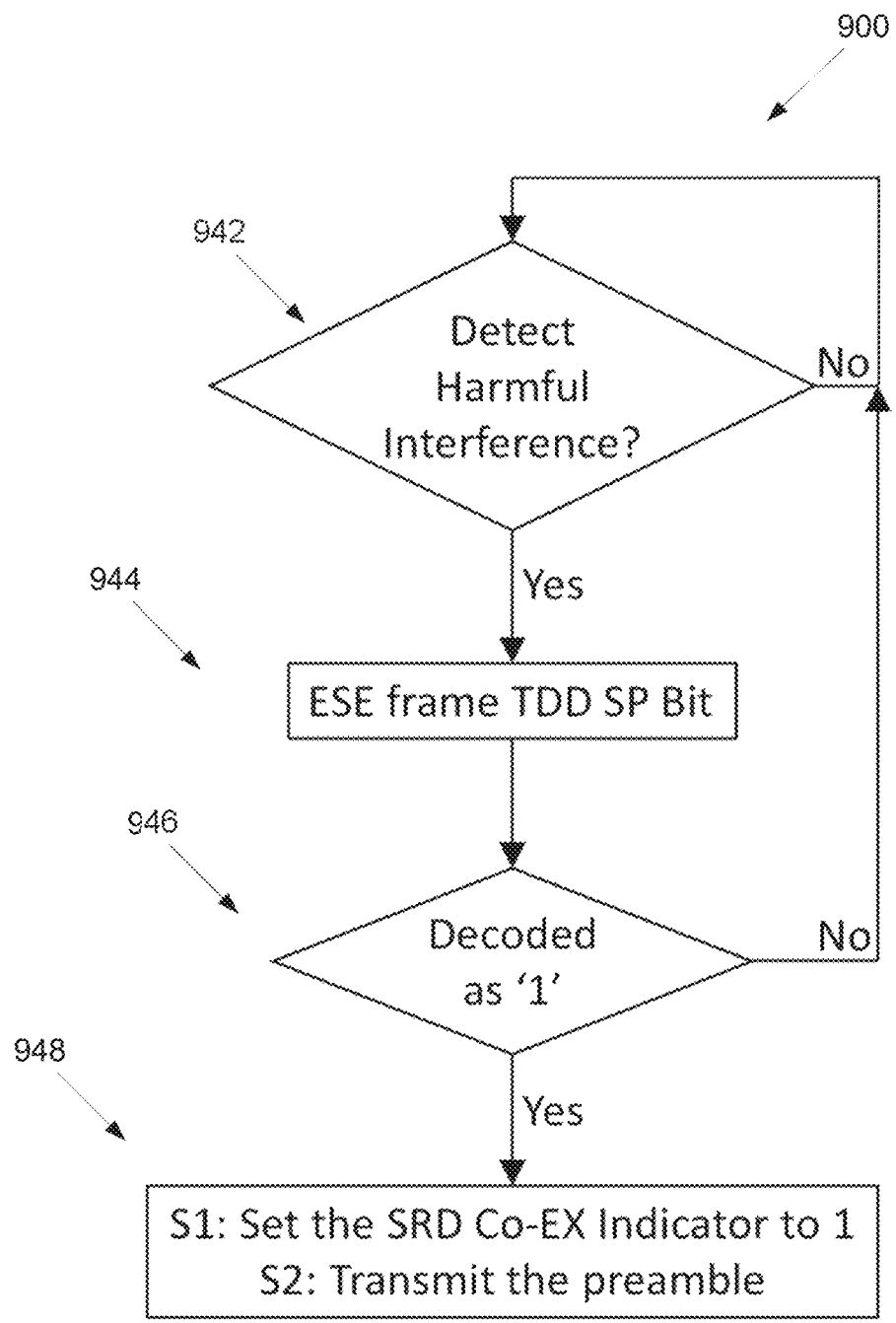
FIG. 9A illustrates a flow chart of a method for SRD to intimate DN according to embodiments of the present disclosure.

FIG. 9A illustrates a flow chart of a method for SRD 900 to intimate DN according to embodiments of the present disclosure. The embodiment of the method for SRD 900 illustrated in FIG. 9A is for illustration only. FIG. 9A does not limit the scope of the present disclosure to any particular implementation.

As shown in FIG. 9A, a receiver detect harmful interference at step 942. In step 944, the receiver determines ESE frame TDD SP bit. In step 946, the receiver determines whether the decoded bit is set to "1." In step 942, if the harmful interference is not detected, the receiver performs step 942 again. In step 946, if the not decoded as "1," the receiver performs step 942. In step 948, the receiver sets the SRD Co-EX indicator to "1" or transmits the preamble.

The present frame structure of the extended schedule element (ESE) of IEEE 802.11ay standard has provisions for the DN to announce that IEEE 802.11ay standard uses the scheduled time division duplex service period (TDD-SP), but has no field for the SRD to communicate that DN is causing interference and blocking the SRD link establishment. This can potentially result in a denial of service for the SRD for extended periods of time. The required apparatus to avoid, obviate or mitigate interference from DN to SRD is absent in the present IEEE 802.11ay frame structure.

Figure 9B:
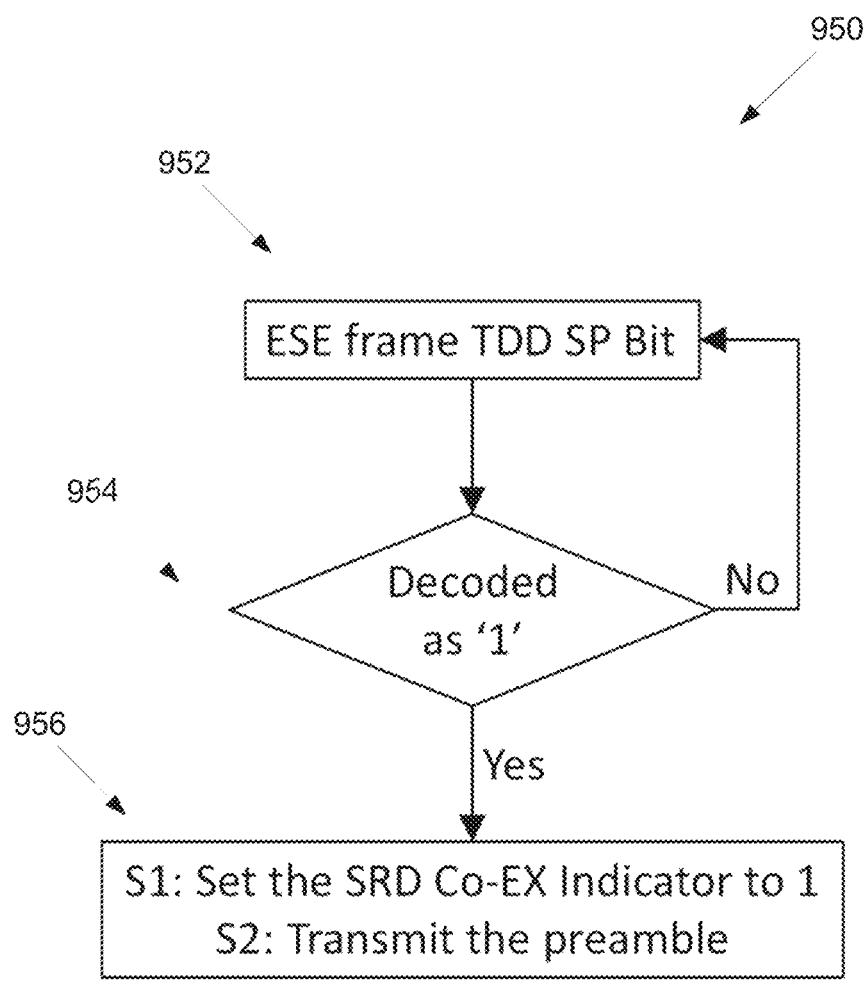
FIG. 9B illustrates another flow chart of a method for SRD to intimate DN according to embodiments of the present disclosure.

FIG. 9B illustrates another flow chart of a method 950 for SRD to intimate DN according to embodiments of the present disclosure. The embodiment of the method 950 illustrated in FIG. 9B is for illustration only. FIG. 9B does not limit the scope of the present disclosure to any particular implementation.

As illustrated in FIG. 9B, the receiver in step 952 determines ESE frame TDD SP bit. In step 954, if the SP bit is decoded as "1," the receiver performs step 956. If not decoded as "1," the receiver performs step 952. In step 956, the receiver sets the SRD Co-EX indicator to "1" and/or the receiver transmits the preamble.

Figure 9C:
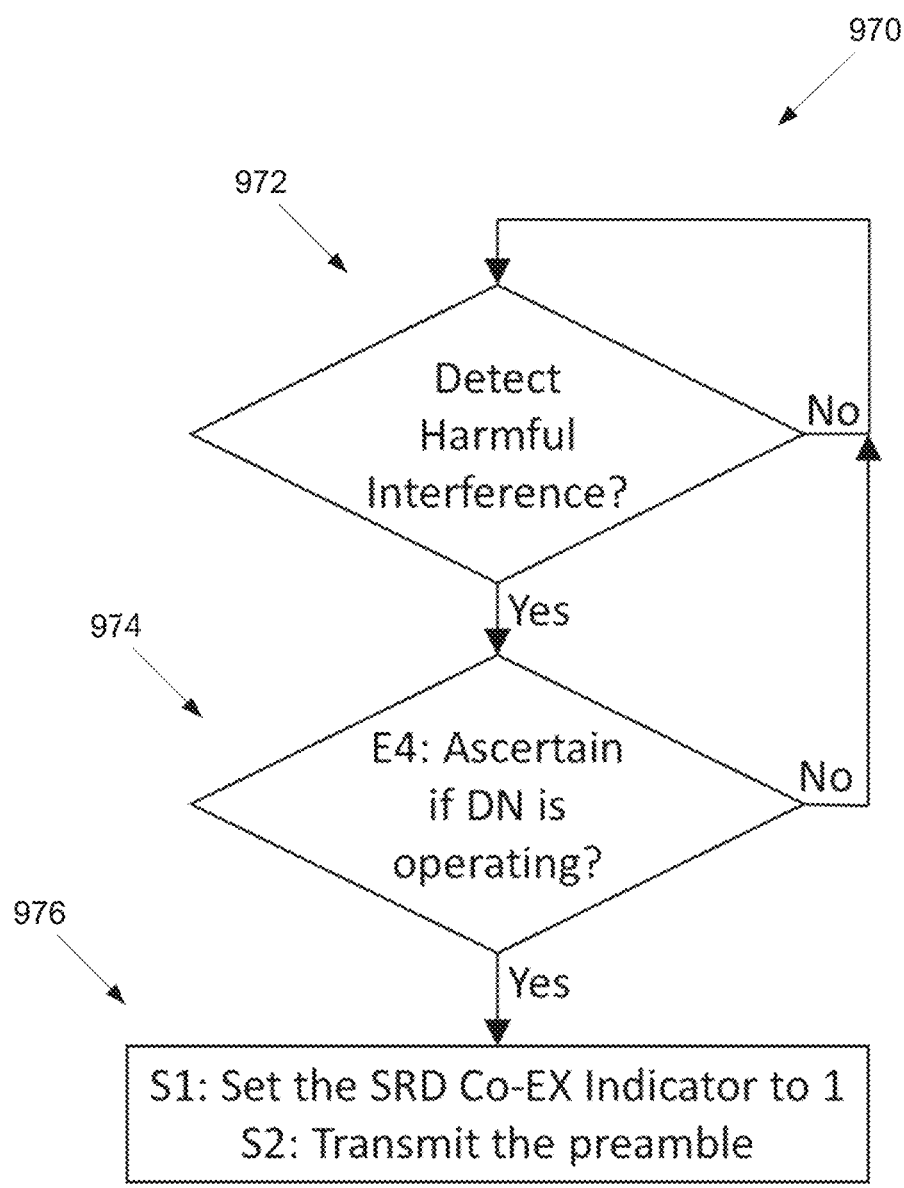
FIG. 9C illustrates a yet another flow chart of a method for SRD to intimate DN according to embodiments of the present disclosure.

FIG. 9C illustrates a yet another flow chart of a method 970 for SRD to intimate DN according to embodiments of the present disclosure. The embodiment of the method 970 illustrated in FIG. 9C is for illustration only. FIG. 9C does not limit the scope of the present disclosure to any particular implementation.

As illustrated in FIG. 9C, the receiver in step 972 detect harmful interference. In step 972, if the harmful interference is not detected, the receiver performs step 1972 again. If the harmful interference is detected in step 972, the receive performs step 974. In step 974, the receiver determines if DN operates. In step 974, the DN does not operate the receiver performs step 972. IF the DN operates, the receiver performs step 976. In step 976, the receiver sets the SRD Co-EX indicator to "1" and/or transmits preamble.

Figure 10:
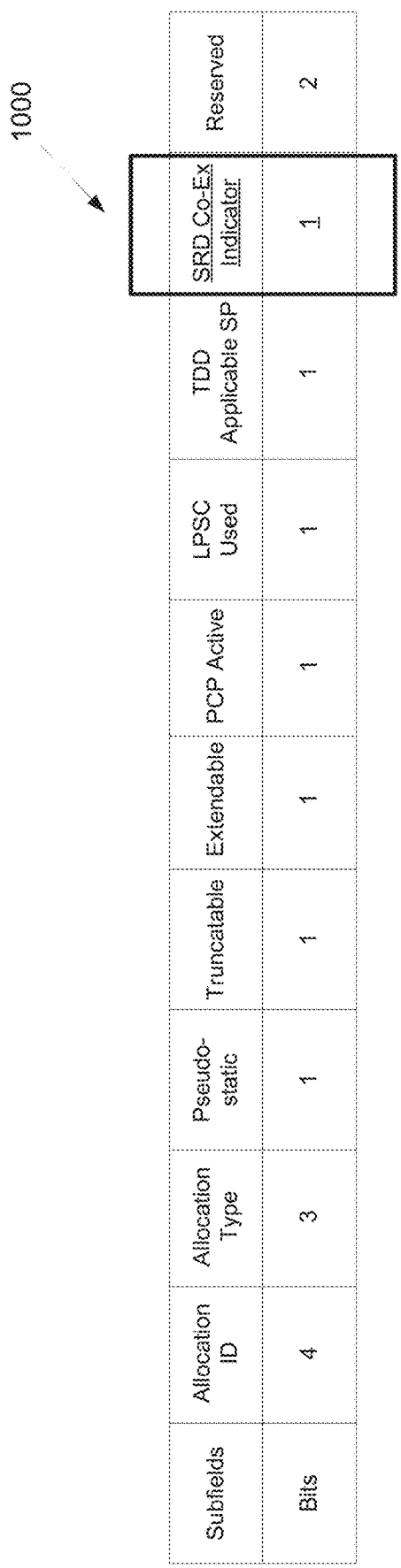
FIG. 10 illustrates an example extended schedule element of 802.11ay according to embodiments of the present disclosure.

FIG. 10 illustrates an example extended schedule element of IEEE 802.11ay 1000 according to embodiments of the present disclosure. The embodiment of the extended schedule element of IEEE 802.11ay 1000 illustrated in FIG. 10 is for illustration only. FIG. 10 does not limit the scope of the present disclosure to any particular implementation.

It may be provided to introduce a new field within IEEE 802.11ay ESE element, which may enable the SRD to indicate the denial of service due to interference. It is termed as "SRD Co-EX Indicator" as shown in FIG. 10. The SRD may decode the ESE sent by the DNs. If the TDD Applicable SP field is "1," the SRD AP may transmit the ESE with SRD Co-EX indicator bit set to "1." The DN, upon reception of the SRD Co-EX indicator bit may take necessary steps as elaborated later in the present disclosure.

In one embodiment, a scheme for the SRD is provided to broadcast a preamble message indicating harmful interferences. The DN (or other SRDs) may read this preamble to take note of the harmful interference, and the DN can then take any necessary or appropriate steps to alleviate the interference to SRD. A prime requirement for such steps is detection of the preamble at DN.

In one embodiment, a DN may have a "listening" slot to detect the preamble. This listening slot can be used by the DN to detect the presence of SRD, and the preamble based detection is only an example to show that the DN can ascertain the presence of SRD.

Figure 11:
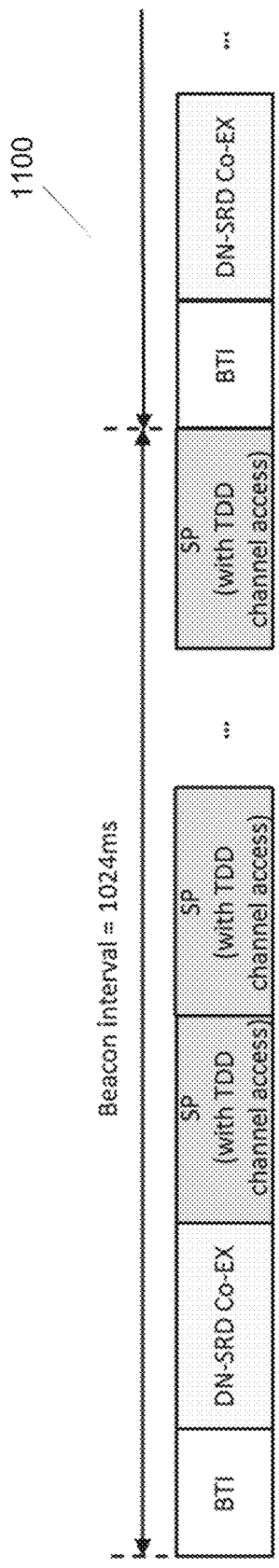
FIG. 11 illustrates an example beacon interval frame to include DN-SRD Co-EX slot in data transmission interval according to embodiments of the present disclosure.

To achieve such embodiment, the modification of the data transmission interval (DTI) frame of the DN is provided to include a dedicated slot for the DN to listen to the preamble message. This slot is termed as the DN-SRD Co-EX slot, and an example frame structure is as shown in FIG. 11. In one example, the DN-SRD Co-EX slot is located immediately after the BTI slot.

FIG. 11 illustrates an example beacon interval frame 1100 to include DN-SRD Co-EX slot in data transmission interval according to embodiments of the present disclosure. The embodiment of the beacon interval frame 1100 illustrated in FIG. 11 is for illustration only. FIG. 11 does not limit the scope of the present disclosure to any particular implementation.

The length of the preamble message and the DN-SRD Co-EX slot are design parameters suitable for the specific technology. Further, the exact location of the DN-SRD Co-EX slot in the DTI is also a specific design parameter to suit a specific technology. However, in general the preamble message time length may be considerably less than the DN-SRD Co-EX slot time interval to allow sufficient time for the DN to detect the preamble.

Another design consideration is the preamble repetition frequency (PRF). In one embodiment, a PRF may be fixed or a variable as a function of time, and that PRF may increase as more time lapses since harmful interference was first encountered. An example of how this embodiment can be achieved is captured through given by $PRF(n)=U[0, 2^n PRF_0]$; $2^n PRF(n) \leq PRF_{max}$ where n=0, 1, 2, . . . are the instances of preamble transmission, $PRF_{max}$ is the maximum PRF as decided by the technology, U represents uniform random variable.

Given that DNs and SRDs are not synchronized, the increasing PRF may increase the probability that DN-SRD Co-EX may coincide with the preamble transmission time of the SRD. It is to be noted that this scheme also enables the DN to discern the existence of more than one SRD when multiple preambles are detected (using schemes like matched filtering, etc. to detect the preamble).

Figure 12:
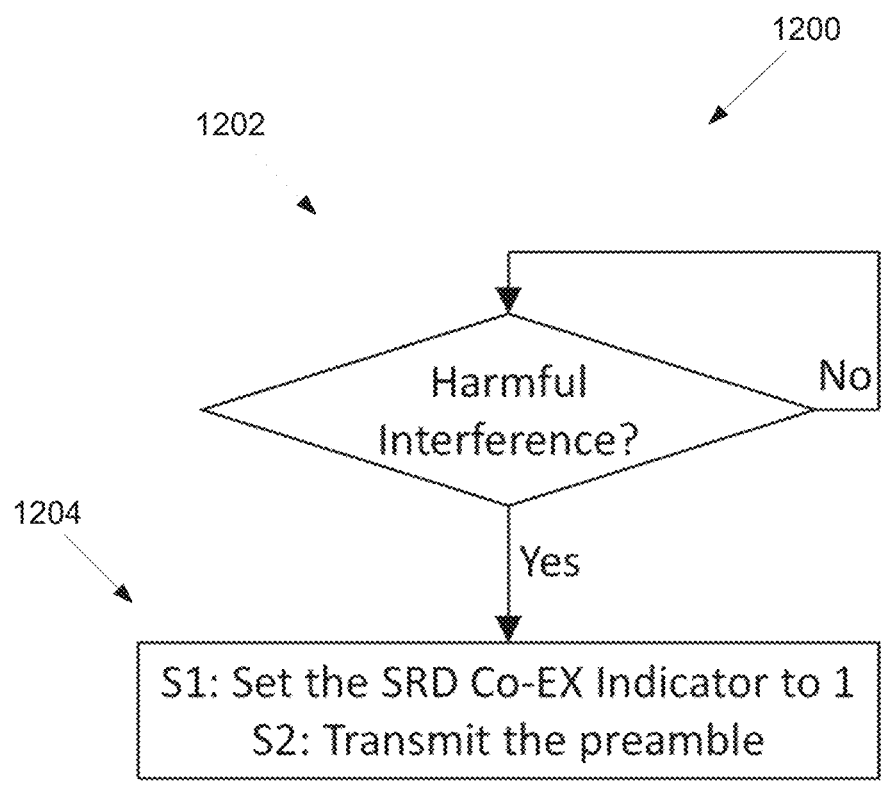
FIG. 12 illustrates a flow chart of a method for interference intimation obviating the requirement for SRD decoding the BTI according to embodiments of the present disclosure.

FIG. 12 illustrates a flow chart of a method 1200 for interference intimation obviating the requirement for SRD decoding the BTI according to embodiments of the present disclosure. The embodiment of the method 1200 illustrated in FIG. 12 is for illustration only. FIG. 12 does not limit the scope of the present disclosure to any particular implementation.

In one embodiment, the requirement of SRD is obviated to decode BTI-ESE. In the eventuality that SRD is either not able to and/or not capable of, or for any other reason cannot decode the ESE BTI to see that TDD-SP bit is set to 1 or cannot employ techniques of E4, then SRD AP can proceed with S1 and/or S2 even directly as described in FIG. 12.

As shown in FIG. 12, the method (e.g., receiver) 1200 determine whether harmful interference is detected in step 1202. If the harmful interference is detected in step 1202, the method 1200 performs step 1204, if not detected, the method 1200 performs step 1202 again. In step 1204, the method 1200 sets the SRD Co-Ex indicator to "1" and/or transmits the preamble.

In one embodiment, a scheme for DN is provided to enable co-existence of SRDs.

Figure 13:
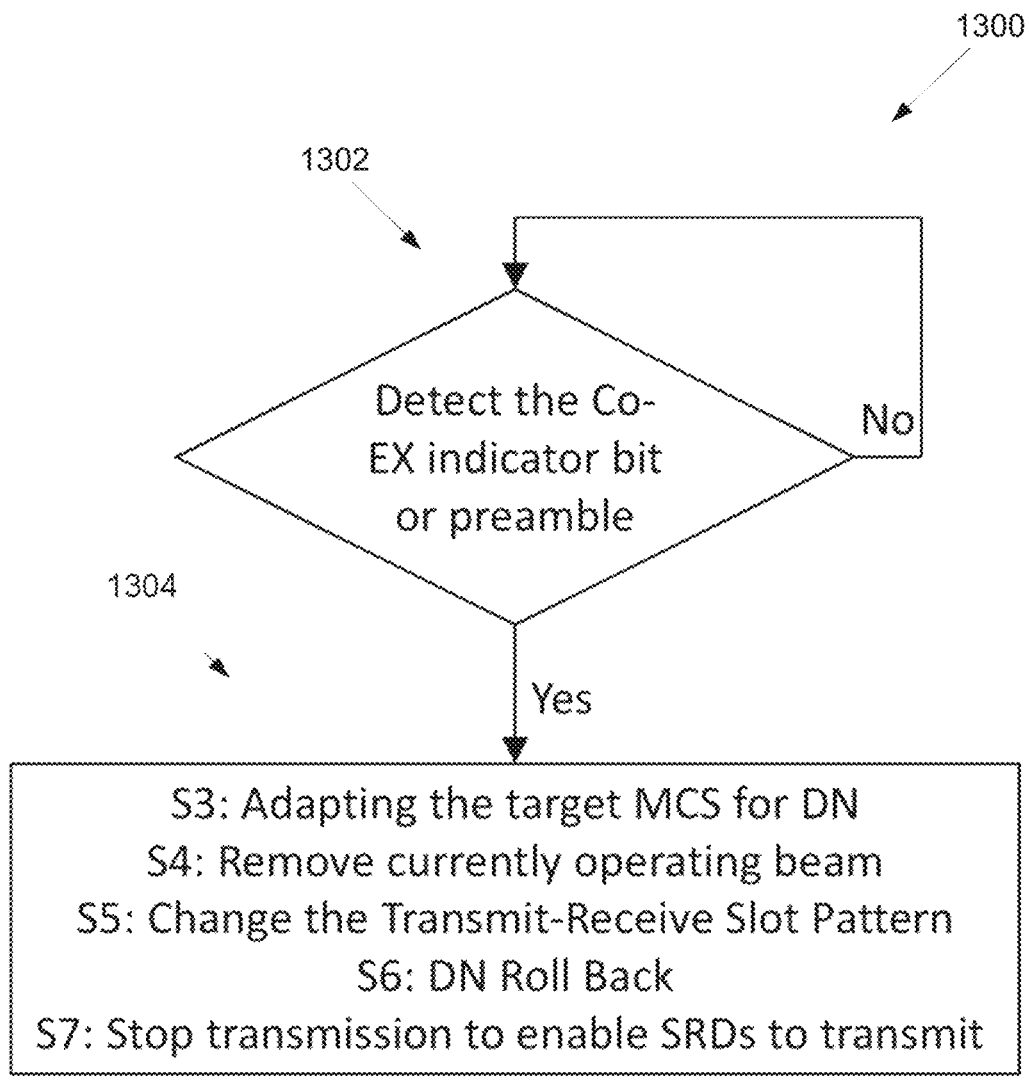
FIG. 13 illustrates a flow chart of a method for DN to enable SRD co-existence according to embodiments of the present disclosure.

FIG. 13 illustrates a flow chart of a method 1300 for DN to enable SRD co-existence according to embodiments of the present disclosure. The embodiment of the method 1300 illustrated in FIG. 13 is for illustration only. FIG. 13 does not limit the scope of the present disclosure to any particular implementation.

To enable co-existence of SRDs, DN can choose between several methods upon receiving the intimation that SRDs are facing harmful interference. These schemes are elaborated in the ensuing sections. The steps are shown in FIG. 13.

As shown in FIG. 13, the method 1300 (e.g., receiver) in step 1302 determine whether the Co-EX indicator bit or preamble is detected. If the Co-EX indicator bit or preamble is not detected the method 1300 performs step 1302 again. In step 1304, the method 1300 performs at least one of adapting the target MCS for the DN, removing current operating beam, changing the transmit-receive slot pattern, achieving DN roll back, or stopping transmission to enable SRDs to transmit.

Transmit power is one of the key parameters that impacts co-existence of SRDs. While transmit power control for DNs is necessary for harmonious co-existence, it may not be sufficient depending on the modulation and coding scheme (MCS) and the resulting target SNR that the DN-DN link is operating. Thus, if the DN gets intimation (or learns) in which the DN causes harmful interference to SRD, it may be provided that DN dynamically adapts the MCS requirement to reduce the target SNR. Accordingly, transmit power required to meet the target SNR is reduced. In IEEE 802.11ay system, at least 21 MCSs are provided. It may be provided that the DN may adapt the target MCS taking into consideration the SRD traffic (in addition to own QoS requirements) to accommodate for harmonious co-existence.

When the DN receives intimation that SRDs are facing harmful interference, the DNs can impose a directivity to the radiation pattern to force a null in the current direction of operation. The rest of the directions may still be available for the DNs to operate. In one example, the necessary condition may be provided for the SRD to access the channel so that harmful interference can be removed.

Figure 14:
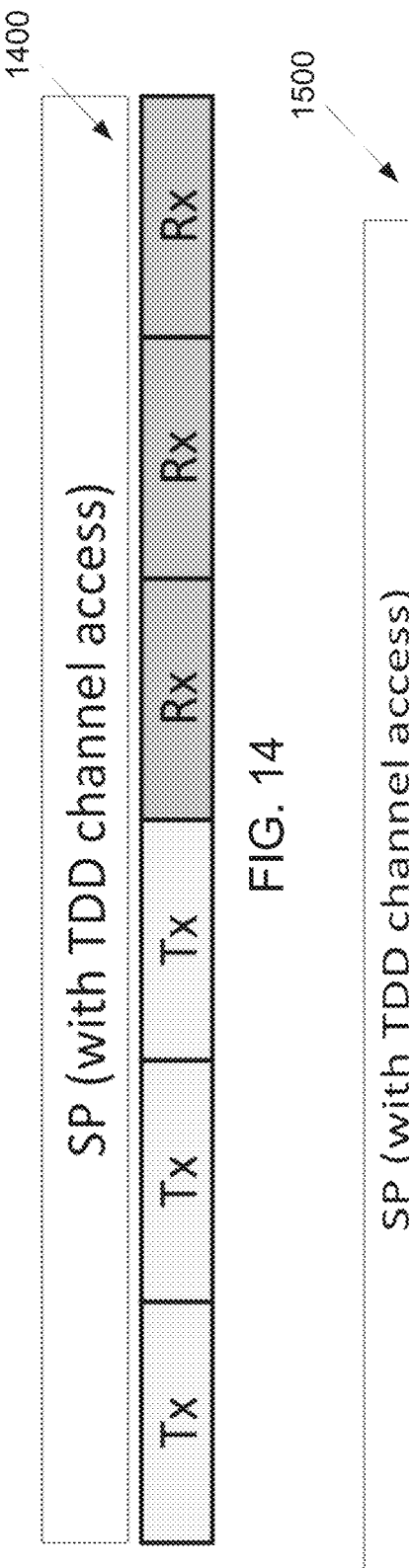
FIG. 14 illustrates an example current Tx-Rx slot frames in 802.11ay according to embodiments of the present disclosure.

In one embodiment, the TDD-SP channel access includes transmit-receive (Tx-Rx) slot frames as shown in FIG. 14.

FIG. 14 illustrates an example current Tx-Rx slot frames 1400 in IEEE 802.11ay according to embodiments of the present disclosure. The embodiment of the current Tx-Rx slot frames 1400 illustrated in FIG. 14 is for illustration only. FIG. 14 does not limit the scope of the present disclosure to any particular implementation.

Figure 15:
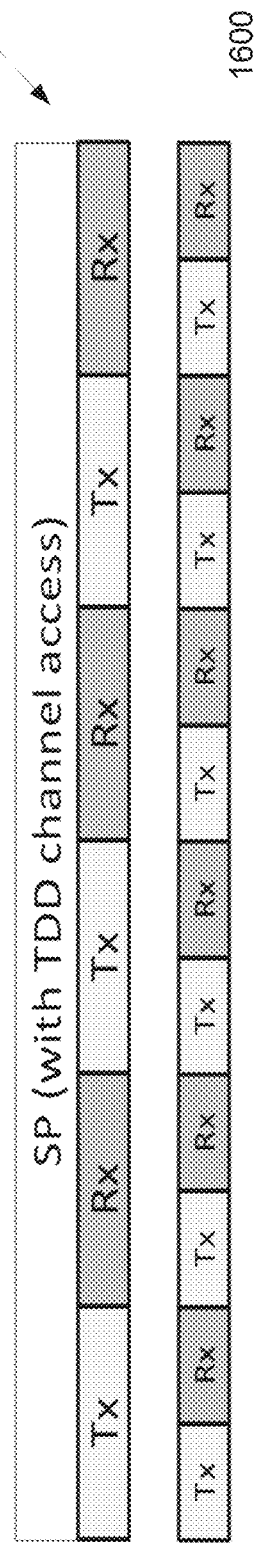
FIG. 15 illustrates an example TDD access slot without impact to the total DN channel access time duration according to embodiments of the present disclosure.

In one embodiment, if the DN is intimated of the harmful interference faced by the SRDs, the slots can be altered as shown in FIG. 15.

FIG. 15 illustrates an example TDD access slot 1500 without impact to the total DN channel access time duration according to embodiments of the present disclosure. The embodiment of the TDD access slots 1500 illustrated in FIG. 15 is for illustration only. FIG. 15 does not limit the scope of the present disclosure to any particular implementation.

In one embodiment, the TDD-SP slot for Tx-Rx allows the SRD to sense a free channel (e.g., meet the CCA threshold). Due to the antenna directivity of the SRD, there is a high probability that only one DN may cause harmful interference at a given time. This embodiment may enable the SRD to establish the link and transmit.

Figure 16:
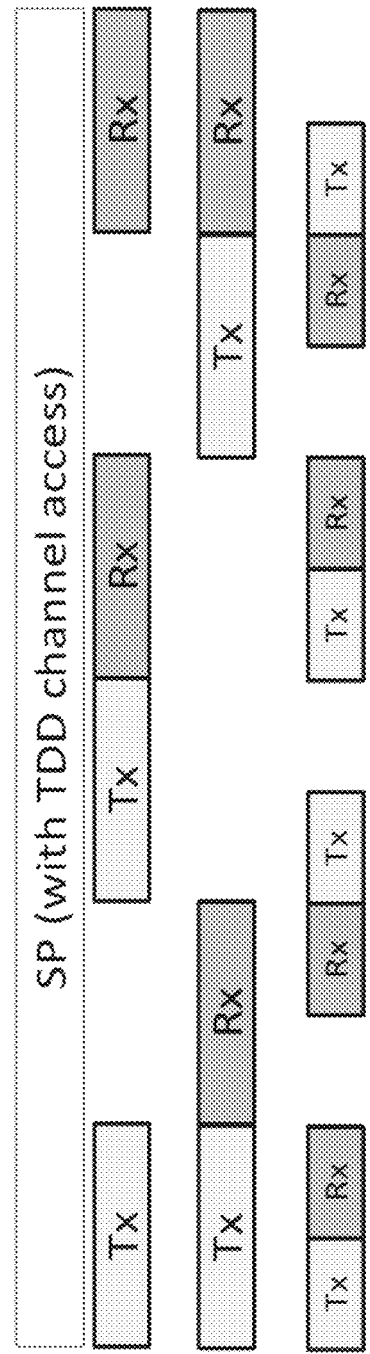
FIG. 16 illustrates an example DN roll back according to embodiments of the present disclosure.

FIG. 16 illustrates an example DN roll back 1600 according to embodiments of the present disclosure. The embodiment of the DN roll back 1600 illustrated in FIG. 16 is for illustration only. FIG. 16 does not limit the scope of the present disclosure to any particular implementation.

In one embodiment, under certain circumstances, there may be more than one DN causing harmful interference to SRD. In such embodiment, it may be provided that DN skips certain slots in the TDD-SP to allow SRDs to establish the link and transmit, as shown in FIG. 16. It may be called as "DN roll back."

In the present disclosure, it may be provided that the DNs completely stop all transmissions for one or more TDD-SP intervals. This step can be employed in cases including but not limited to the DNs are causing interference to too many SRDs.

In one embodiment, some schemes for the DN are provided to announce the presence of the DNs and indicate to the SRD that DN (or TDD-SP) transmissions are taking place. One possible way for SRD to determine the presence of a DN is to decode the TDD-SP field in the ESE of the BTI frame. However, since BTI is transmitted only once in a beacon interval, the chances that SRD may receive a BTI packet during the time that it is sensing the channel is quite low. In order for the SRD to take any action and/or inform DN that it is facing harmful interference, SRD may ascertain the presence (and operations) of DN within the vicinity.

In one example, it may be provided that DN may transmit (announce) information indicating the presence of the DN that may be decoded by SRD to ascertain DN presence. The examples including but not limited to, of the frame format that the DN can transmit.

FIG. 17 illustrates an example modified EDMG PHY packet structure 1700 comprising of Co-EX indicator field according to embodiments of the present disclosure. The embodiment of the modified EDMG PHY packet structure 1700 illustrated in FIG. 17 is for illustration only. FIG. 17 does not limit the scope of the present disclosure to any particular implementation.

In one embodiment, the packet structure of EDMG PHY (PPDU) is modified to include an exclusive field called Co-EX indicator as shown in FIG. 17.

The Co-EX Indicator field contains information to inform whether the PHY packet originated from a DN (TDD-SP) device and the time left to the next DN-SRD Co-EX slot (in the Beacon Interval), an example of which is shown in FIG. 18.

FIG. 18 illustrates an example Co-EX indicator of the modified PHY packet structure 1800 according to embodiments of the present disclosure. The embodiment of the Co-EX indicator of the modified PHY packet structure 1800 illustrated in FIG. 18 is for illustration only. FIG. 18 does not limit the scope of the present disclosure to any particular implementation.

In one embodiment, the time to next DN-SRD slot is included to convey the duration after which the SRD can take any action to inform the DN that it is being blocked (for example, transmitting the preamble). In such embodiment, the SRD may be enabled to carry out transmissions informing DN in the slot that DN is "listening" to SRDs.

FIG. 19 illustrates an example Co-EX information frame (CIF) 1900 according to embodiments of the present disclosure. The embodiment of the Co-EX information frame (CIF) 1900 illustrated in FIG. 19 is for illustration only. FIG. 19 does not limit the scope of the present disclosure to any particular implementation.

In one embodiment, it may be provided that the DN periodically transmits the Co-EX Indicator information in the data field of the existing PHY packet structure, termed as "Co-EX information frame" (CIF) as shown in FIG. 19. The frequency with which the CIF is transmitted is a design parameter.

The format of the Co-EX indicator can be the same as illustrated in FIG. 18, but prefixed with a CIF header field to indicate that the frame is a CIF. Several other formats are also possible, which essentially convey that the frame is a Co-EX information frame, the TDD-SP indicator, and fields from which the time for the next DN-SRD slot can be derived. Example of this is shown in FIG. 20.

FIG. 20 illustrates an example format of Co-EX indicator within CIF 2000 according to embodiments of the present disclosure. The embodiment of the format of Co-EX indicator within CIF 2000 illustrated in FIG. 20 is for illustration only. FIG. 20 does not limit the scope of the present disclosure to any particular implementation.

The beacon interval indicates the length of the beacon interval, a CIF interval indicates the periodicity with of CIF (within the beacon interval), and the CIF number indicates the number of this CIF since the last BTI. This number is reset after every BTI. This information can be used by SRD to derive the DN-SRD Co-EX slot within the beacon interval (e.g., a fixed slot).

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A first node for a co-existence operation in a wireless communication system, the first node comprising:
   a transceiver configured to receive interference from a second node; and
   a processor operably connected to the transceiver, the processor configured to:
      determine whether a level of the interference exceeds a pre-determined threshold; and
      decode a time-division multiplexing service period (TDD-SP) bit included in a first extended schedule element (ESE) frame received from the second node when the level of the interference exceeds the pre-determined threshold,
   wherein the transceiver is further configured to transmit, to the second node, a preamble or a second ESE frame including a short range device co-existence (SRD Co-Ex) indicator that is set to one based on a value of the decoded TDD-SP bit.

2. The first node of claim 1, wherein the SRD Co-Ex indicator indicates whether the first node performs a service during an extended periods of time based on the level of the interference.

3. The first node of claim 1, wherein the preamble is broadcast within a specific slot that is used for providing a listening mode of the second node.

4. The first node of claim 3, wherein the specific slots are determined within a data transmission interval (DTI) frame of the second node.

5. The first node of claim 1, wherein the first node operates in a listen-before-talk (LBT) mode and the second node operates in a non-LBT mode.

6. A second node for a co-existence operation in a wireless communication system, the second node comprising:
   a transceiver configured to:
      transmit, to a first node, a first extended schedule element (ESE) frame including a time-division multiplexing service period (TDD-SP) bit; and
      receive, from the first node, a preamble or a second ESE frame including a short range device co-existence (SRD Co-Ex) indicator that is set to one based on the TDD-SP bit, wherein the SRD Co-Ex indicator indicates information about interference; and
   a processor operably connected to the transceiver, the processor configured to change a transmit-receive slot pattern based on the received preamble or SRD Co-Ex indicator for the co-existence operation.

7. The second node of claim 6, wherein the processor is further configured to adapt a target modulation coding scheme (MCS) to reduce a transmit power for the co-existence operation.

8. The second node of claim 6, wherein the processor is further configured to remove an operating beam to change a directivity of a radiation pattern of the second node for the co-existence operation.

9. The second node of claim 6, wherein the processor is further configured to perform a roll back of the second node such that the second node skips at least one specified slot in a TDD-SP to allow a communication of the first node.

10. The second node of claim 6, wherein the processor is further configured to stop transmissions for one or more TDD-SP intervals.

11. The second node of claim 6, wherein:
   the processor is further configured to generate an enhanced directional multi-gigabit physical (EDMG PHY) packet including a Co-Ex indicator field to indicate that the second node is located in a range of a communication with the first node; and
   the transceiver is further configured to transmit, to the first node, the EDMG PHY packet,
   wherein the Co-Ex indicator indicates that the EDMG PHY packet is generated from the second node and time information of a beacon interval.

12. The second node of claim 11, wherein the transceiver is further configured to periodically transmit information associated with the Co-EX indicator, the information included in a data portion of a Co-Ex information frame (CIF).

13. The second node of claim 6, wherein the first node operates in a listen-before-talk (LBT) mode and the second node operates in a non-LBT mode.

14. A method of a second node for a co-existence operation in a wireless communication system, the method comprising:
   transmitting, to a first node, a first extended schedule element (ESE) frame including a time-division multiplexing service period (TDD-SP) bit;
   receiving, from the first node, a preamble or a second ESE frame including a short device co-existence (SRD Co-Ex) indicator that is set to one based on the TDD-SP bit, wherein the SRD Co-Ex indicator indicates information about interference; and changing a transmit-receive slot pattern based on the received preamble or SRD Co-Ex indicator for the co-existence operation.

15. The method of claim 14, further comprising adapting a target modulation coding scheme (MCS) to reduce a transmit power for the co-existence operation.

16. The method of claim 14, further comprising removing an operating beam to change a directivity of a radiation pattern of the second node for the co-existence operation.

17. The method of claim 14, further comprising performing a roll back of the second node such that the second node skips at least one specified slot in a TDD-SP to allow a communication of the first node.

18. The method of claim 14, further comprising stopping transmissions for one or more TDD-SP intervals.

19. The method of claim 14, further comprising:
generating an enhanced directional multi-gigabit physical (EDMG PHY) packet including a Co-Ex indicator field to indicate that the second node is located in a range of a communication with the first node; and
transmitting, to the first node, the EDMG PHY packet, wherein the Co-Ex indicator indicates that the EDMG PHY packet is generated from the second node and time information of a beacon interval.

20. The method of claim 19, further comprising periodically transmitting information associated with the Co-EX indicator, the information included in a data portion of a Co-Ex information frame (CIF).

* * * * *

UNITED STATES PATENT AND TRADEMARK OFFICE
CERTIFICATE OF CORRECTION

PATENT NO. : 11,343,064 B2
APPLICATION NO. : 16/401050
DATED : May 24, 2022
INVENTOR(S) : Aditya V. Padaki et al.

It is certified that error appears in the above-identified patent and that said Letters Patent is hereby corrected as shown below:

On the Title Page

Item (60), Line 3, "May 14, 2018" should read --May 24, 2018--.

Signed and Sealed this
Eleventh Day of June, 2024

Katherine Kelly Vidal
*Director of the United States Patent and Trademark Office*